(12) United States Patent
Kim et al.

(10) Patent No.: US 10,437,006 B2
(45) Date of Patent: Oct. 8, 2019

(54) CAMERA FILTER MODULE

(71) Applicant: JAHWA electronics Co., Ltd., Chungcheongbuk-do (KR)

(72) Inventors: Hee Seung Kim, Seoul (KR); In Soo Kim, Gyeonggi-do (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 57 days.

(21) Appl. No.: 15/378,858

(22) Filed: Dec. 14, 2016

(65) Prior Publication Data

US 2017/0090147 A1  Mar. 30, 2017

Related U.S. Application Data

(62) Division of application No. 14/718,628, filed on May 21, 2015.

(51) Int. Cl.
| | |
|---|---|
| *G02B 7/08* | (2006.01) |
| *G02B 27/64* | (2006.01) |
| *G03B 3/10* | (2006.01) |
| *G02B 7/00* | (2006.01) |

(52) U.S. Cl.
CPC ............... *G02B 7/08* (2013.01); *G02B 7/006* (2013.01); *G02B 27/646* (2013.01); *G03B 3/10* (2013.01)

(58) Field of Classification Search
CPC .......... G02B 7/006; G02B 5/22; G02B 5/205; G03B 9/08; G03B 9/10; G03B 9/12–22; G03B 2205/0069
See application file for complete search history.

(56) References Cited

U.S. PATENT DOCUMENTS

| | | | |
|---|---|---|---|
| 7,708,479 B2 | 5/2010 | Watanabe et al. | |
| 2008/0197949 A1* | 8/2008 | Lurquin | G02B 7/102 335/229 |
| 2011/0122311 A1* | 5/2011 | Han | G03B 9/14 348/362 |
| 2013/0128093 A1* | 5/2013 | Hwang | G03B 3/02 348/335 |
| 2014/0160311 A1* | 6/2014 | Hwang | G02B 27/646 348/208.99 |

(Continued)

FOREIGN PATENT DOCUMENTS

| | | |
|---|---|---|
| CN | 101221342 A | 7/2008 |
| JP | 2009-288494 A | 12/2009 |

(Continued)

OTHER PUBLICATIONS

Machine translation of KR20090012497, retrieved electronically from ESPACENET, Jan. 3, 2017.*

(Continued)

*Primary Examiner* — Wen Huang
(74) *Attorney, Agent, or Firm* — Maier & Maier, PLLC

(57) ABSTRACT

Disclosed herein is a camera lens module. The camera lens module may include a base in which a lens barrel is placed, an auto-focusing driving unit disposed in parallel to the first side surface of the base in such a way as to face the first side surface and disposed to face the lens barrel, and an optical element driving unit disposed in parallel to a second side surface placed in a direction opposite the first side surface, disposed to face the lens barrel, and disposed to stand opposite to the auto-focusing driving unit.

3 Claims, 21 Drawing Sheets

(56) References Cited

U.S. PATENT DOCUMENTS

2014/0355118 A1* 12/2014 Park .................... G02B 27/646
359/557

FOREIGN PATENT DOCUMENTS

| JP | 2011-39424 A | 2/2011 |
|----|----|----|
| KR | 10-0849580 B1 | 7/2008 |
| KR | 10-2009-0012497 A | 2/2009 |
| KR | 10-2011-0025512 A | 3/2011 |
| KR | 10-2012-0010421 A | 2/2012 |
| KR | 10-2012-0045333 A | 5/2012 |
| KR | 10-1314178 B1 | 10/2013 |
| KR | 10-2010-1343197 B1 | 12/2013 |

OTHER PUBLICATIONS

Office Action dated Apr. 24, 2018 in corresponding Chinese Application No. 201510289178.7; 12 pages including English-language translation.

Office Action dated Sep. 1, 2015 in corresponding Application No. KR 10-2014-0012611; 8 pgs.

\* cited by examiner

CAMERA FILTER MODULE

BACKGROUND OF THE INVENTION

1. Technical Field

Embodiments of the present invention relate to a small-sized camera lens module mounted on the front or rear of the main body of a mobile communication terminal and used in various photographing modes.

2. Description of the Related Art

Recently, at least one light, thin, short, and small camera lens module is adopted in a mobile communication terminal, such as a tablet PC or smart phone that is generalized with the recent development of a mobile communication technology. In particular, there is a user's high-capacity and high-performance demand for the camera lens module adopted in the mobile communication terminal. Furthermore, the camera lens module is being developed in the direction advantageous for a small size while maintaining its high capacity and high performance.

A small camera lens module adopted in a mobile communication terminal is equipped with an auto-focusing function and a digital zoom function and also equipped with a stabilizer function so that it is faithful to its camera function. In general, a known camera lens module includes a lens, a lens driving unit configured to move the lens in the direction of the optical axis and provide a movable force for focus control, and an image sensor configured to photograph light incident through the lens and convert the photographed light into an image signal. The camera lens module is configured to perform focusing on a subject for photographing by automatically controlling the distance between the lens and the image sensor.

The lens driving unit of the camera lens module that implements auto-focusing may be divided into a voice coil motor (VCM) type using an interaction principle between a magnetic field and an electric field and an encoding type in which the location of the lens is automatically controlled in response to the detection of the sensor. In a method of implementing a focusing function in the VCM type camera lens module, a VCM is chiefly used as a driving source. The VCM includes a magnet configured to generate a magnetic force and a coil supplied with an electric current and moves a lens barrel by a force generated by the interaction between an electric field and a magnetic field. Likewise, the encoding type camera lens module includes a magnet and a coil supplied with an electric current and provides a movable force.

For example, a conventional small-sized auto-focusing camera lens module mounted on a mobile communication terminal is disclosed in "Korean Patent Application No. 2010-106811", "Korean Patent Application No. 2009-83613", "Korean Patent Application No. 2012-85890", and "Korean Patent Application No. 2010-71948."

SUMMARY OF THE INVENTION

However, as a mobile communication terminal gradually becomes light-weight and slim while maintaining high performance, a camera lens module mounted on the main body of the terminal also needs to be reduced in size while maintaining high performance.

The disposition of a driving unit is very important in a reduction in the size of the camera lens module. An auto-focusing driving unit is essentially mounted on the driving unit included in the camera lens module. An optical element driving unit, a shutter driving unit, or an optical image stabilizer driving unit may be additionally configured in the camera lens module depending on performance of a terminal. If such driving units are reduced in size and the small-sized driving units are disposed in empty spaces of the camera lens module, a reduction in the size of the camera lens module can be achieved.

Accordingly, an embodiment of the present invention is directed to the provision of a camera lens module advantageous for a small-size design.

Furthermore, an embodiment of the present invention is intended to provide a camera lens module including an optical element driving unit advantageous for a small-size design.

Furthermore, an embodiment of the present invention is intended to provide a camera lens module including an optical element assembly advantageous for a small-size design.

Furthermore, an embodiment of the present invention is intended to provide a camera lens module advantageous for a small-sized driving unit by disposing an optical element driving unit in such a way as to face an auto-focusing driving unit or an optical image stabilizer driving unit on the basis of a lens barrel.

Furthermore, an embodiment of the present invention is directed to the provision of a camera lens module capable of adopting a multi-filter, photographing in various photographing modes, and an easy mode change.

In accordance with an embodiment of the present invention, a camera lens modules includes a base in which a lens barrel is placed, an auto-focusing driving unit disposed in parallel to the first side surface of the base in such a way as to face the first side surface and disposed to face the lens barrel, and an optical element driving unit disposed in parallel to a second side surface placed in a direction opposite the first side surface in an upright state in such a way as to face the second side surface, disposed to face the lens barrel, and disposed to stand opposite to the auto-focusing driving unit.

Furthermore, in accordance with an embodiment of the present invention, a camera lens modules includes a base in which a lens barrel is placed, an auto-focusing driving unit disposed in parallel to the first side surface of the base in such a way as to face the first side surface and disposed to face the lens barrel, and an optical element driving unit disposed in parallel to a second side surface placed in a direction perpendicular to the first side surface in an upright state in such a way as to face the second side surface, disposed to face the lens barrel, and disposed to stand opposite to the auto-focusing driving unit.

Furthermore, in accordance with an embodiment of the present invention, optical image stabilizer driving units are disposed in parallel to third and fourth side surfaces that respectively stand opposite to the first and the second side surfaces in an upright state, or one optical image stabilizer driving unit is disposed in parallel to any one of the third and the fourth side surfaces in an upright state in such a way as to face any one of the third and the fourth side surfaces.

Furthermore, in accordance with an embodiment of the present invention, a camera lens modules includes a base in which a lens barrel is placed, an auto-focusing driving unit disposed in the first corner area of the base in such a way as to upright face the lens barrel, and an optical element driving unit disposed in a second corner area placed in a direction diagonally opposite the first corner area in such a way as to upright face the lens barrel and disposed to stand opposite to the auto-focusing driving unit.

Furthermore, in accordance with an embodiment of the present invention, a camera lens modules includes a base in which a lens barrel is placed, an auto-focusing driving unit disposed in a first corner area of the base in such a way as to upright face the lens barrel, and an optical element driving unit disposed in a second corner area placed in a direction perpendicular to the first corner area in such a way as to upright face the lens barrel and disposed to be adjacent to the auto-focusing driving unit.

Furthermore, in accordance with an embodiment of the present invention, optical image stabilizer driving units are respectively disposed to face the lens barrel in third and fourth corner areas respectively disposed to stand opposite to the first and the second corner areas, or one optical image stabilizer driving unit is disposed in any one of the third and the fourth corner areas.

Furthermore, in accordance with an embodiment of the present invention, a camera lens module includes an optical element base, an optical element driving unit configured in a flat plate form, disposed to face one side surface of the camera lens module in parallel, and upright disposed in the optical element base in a direction of an optical axis, and an optical element assembly configured to comprise an optical element unit disposed in parallel to a top surface of the optical element base and rotated in conjunction with the optical element driving unit.

Furthermore, the optical element driving unit in accordance with an embodiment of the present invention includes a movable magnet configured to linearly move in parallel to the one side surface in the state in which the optical element driving unit has faced the one side surface.

Furthermore, the optical element driving unit in accordance with an embodiment of the present invention includes one or a plurality of yokes mounted on the optical element base and made of a magnetic material, a coil mounted on the optical element base and disposed in parallel to the yokes, a flat plate-shaped movable magnet separated from the coil, disposed in parallel to the coil in such a way as to face the coil, and disposed to linearly move over the coil when an electric current is applied to the coil, and one or a plurality of guides provided in specific regions of the optical element base and configured to smooth a movement of the movable magnet.

Furthermore, the movable magnet in accordance with an embodiment of the present invention moves over the guides in a direction perpendicular to the direction of the optical axis.

Furthermore, the yokes in accordance with an embodiment of the present invention include first and second yokes symmetrically disposed in parallel, mounted in the direction of the optical axis, and disposed to face the movable magnet.

Furthermore, the guides in accordance with an embodiment of the present invention include first and second guides symmetrically disposed on both sides of the first and the second yokes.

Furthermore, the first guide in accordance with an embodiment of the present invention is configured in pairs and includes at least one ball bearing, and the second guide is disposed symmetrically to the first guides based on the coil and includes at least one ball bearing.

Furthermore, the camera lens module in accordance with an embodiment of the present invention further includes a magnet transfer housing on which the movable magnet is mounted. The magnet transfer housing is configured in a flat plate form and disposed to move over the coil along with the movable magnet with a gap by the guides.

Furthermore, the magnet transfer housing in accordance with an embodiment of the present invention further includes a coupling pin extended in the direction of the optical axis in a top corner on one side of the magnet transfer housing so that the magnet transfer housing is coupled to the optical element unit. The optical element unit is disposed to rotate around a hinge when the magnet transfer housing linearly reciprocates.

Furthermore, at least one proximity sensor is disposed in the internal space of the coil or near the coil and configured to detect the location of the movable magnet.

Furthermore, the optical element unit in accordance with an embodiment of the present invention includes a filter blade configured to include one or a plurality of filters.

Furthermore, the filter in accordance with an embodiment of the present invention may include a multi-filter configured to include a visible ray filter and an infrared filter disposed in parallel to the visible ray filter.

Furthermore, the optical element unit in accordance with an embodiment of the present invention includes a filter blade configured to include a blade having a filter or shutter function.

Furthermore, in accordance with an embodiment of the present invention, a camera lens modules includes a base, one or a plurality of yokes mounted on one side surface of the base, a coil mounted on the base and disposed to face the yoke, a flat plate-shaped movable magnet disposed in parallel to the coil in such a way as to face the coil and disposed to linearly move over the coil when an electric current is applied to the coil, and a plurality of guides provided between the movable magnet and the coil and configured to guide a movement of the movable magnet.

Furthermore, the camera lens module in accordance with an embodiment of the present invention further includes a magnet transfer housing on which the movable magnet is mounted. The magnet transfer housing is configured in a flat plate form and disposed to move over the coil along with the movable magnet with a gap by a rolling operation of the guides.

BRIEF DESCRIPTION OF THE DRAWINGS

The aforementioned and other aspects, characteristics, and advantages of embodiments of the present invention will become evident from the following description taken along with the accompanying drawings.

DETAILED DESCRIPTION

Figure 1:
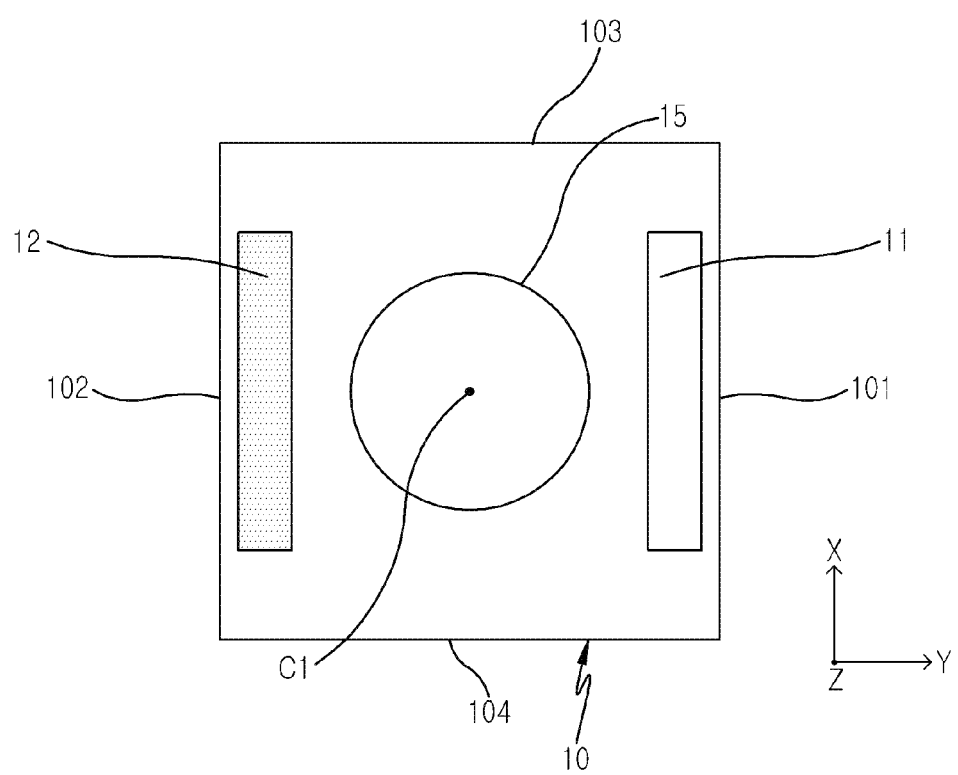
FIG. 1 is a plan view schematically illustrating the disposition of the driving units of a camera lens module in accordance with a first embodiment of the present invention.

Hereinafter, exemplary embodiments of the present invention are described in detail with reference to contents described in the accompanying drawings. However, the present invention is not limited to or restricted by the exemplary embodiments. The same reference numeral suggested in each drawing denotes an element having substantially the same function.

Terms including ordinal numbers, such as the first and the second, may be used to describe various elements, but the elements are not restricted by the terms. The terms are used to only distinguish one element from the other element. For example, in various embodiments of the present invention, a first element may be named a second element. Likewise, a second element may be named a first element. The terms used in this application have been used to only describe specific embodiments and are not intended to restrict the present invention. An expression of the singular number includes an expression of the plural number unless clearly defined otherwise in the context.

Furthermore, in describing embodiments of the present invention, a term "substantially" does not mean that a cited characteristic, parameter, or value must be accurately achieved and may be generated to the extent that an effect to be provided by a deviation, change, or characteristic, including a tolerance, an error of measurement, an accuracy limit in measurement, and other factors known to those skilled in the art, is not excluded.

The disposition of driving units mounted on a camera lens module in accordance with embodiments of the present invention is described below with reference to FIGS. 1 to 3. In describing an embodiment of the present invention, a three-dimensional X/Y/Z coordinate system has been illustrated. In this case, a "Z axis" means a direction perpendicular to the camera lens module and the direction of an optical axis in which a lens barrel moves. An "X axis" means a direction horizontal to the camera lens module (i.e., a direction perpendicular to the optical axis), and a "Y axis" means a direction vertical to the camera lens module (i.e., a direction vertical to the optical axis and perpendicular to the X axis).

Furthermore, a mobile communication terminal on which a camera lens module in accordance with an embodiment of the present invention is mounted is only a common term. An embodiment of the present invention may also be applied to any one of a mobile phone, a palm-sized personal computer (PC), a personal communication system (PSC), a personal digital assistant (PDA), a hand-held PC (HPC), a smart phone, a local area network (LAN) terminal, a laptop computer, and a tablet PC. Accordingly, the term "mobile communication terminal" is not intended to limit the application of the present invention to any device of a specific type. Since a camera lens module in accordance with an embodiment of the present invention is advantageous for a small size, it may be properly mounted on a mobile communication terminal that belongs to mobile communication terminals and that can be easily held in one hand, such as a smart phone.

Driving units mounted on a camera lens module in accordance with various embodiments of the present invention may include an auto-focusing driving unit, an optical image stabilizer driving unit, and an optical element driving unit selectively or in combination. For example, only the auto-focusing driving unit may be mounted on the camera lens module, only the auto-focusing driving unit and the optical image stabilizer driving unit may be mounted on the camera lens module, or all of the auto-focusing driving unit, the optical image correction unit, and the optical element driving unit may be mounted on the camera lens module depending on performance of the camera lens module.

Furthermore, one or a plurality of the auto-focusing driving units may be mounted on the camera lens module, one or a plurality of the optical image stabilizer driving units may be mounted on the camera lens module, and one or a plurality of the optical element driving units may be mounted on the camera lens module.

All of the driving units may be mounted on a camera lens module in accordance with various embodiments of the present invention depending on performance of the camera lens module. For a reason of a reduction in size, the auto-focusing driving unit is essentially mounted on the camera lens module, but the optical image stabilizer driving unit or the optical element driving unit may be selectively mounted on the camera lens module through a selective combination with the auto-focusing driving unit. The auto-focusing driving unit, the optical image stabilizer driving unit, and the optical element driving unit are efficiently disposed in empty spaces on the basis of a lens barrel that moves in the optical axis of the camera lens module.

FIG. 1 is a plan view schematically illustrating the disposition of the driving units of a camera lens module in accordance with a first embodiment of the present invention. The disposition of the driving units of the camera lens module in accordance with the first embodiment of the present invention is described below with reference to FIG. 1.

The camera lens module includes a base 10, an auto-focusing driving unit 11, and an optical element driving unit 12. The base 10 may have a polyhedron shape, approximately a rectangular shape. The base 10 includes a top surface, a bottom surface, and 4 side surfaces. The four side surfaces hereinafter refer to a first side surface 101, a second side surface 102, a third side surface 103, and a fourth side surface 104. The first side surface 101 is disposed to face the second side surface 102 in parallel to the second side surface 102 and disposed to neighbor the third and the fourth side surfaces 103, 104 in a direction perpendicular to the third and the fourth side surfaces 103, 104. The second side surface 102 is disposed to face the first side surface 101 in parallel to the first side surface 101 and disposed to neighbor the third and the fourth side surfaces 103, 104 in a direction perpendicular to the third and the fourth side surfaces 103, 104. The third side surface 103 is disposed to face the fourth side surface 104 in parallel to the fourth side surface 104 and disposed to neighbor the first and the second side surfaces 101, 102 in a direction perpendicular to the first and the second side surfaces 101, 102. The fourth side surface 104 is disposed to face the third side surface 103 in parallel to the third side surface 103 and disposed to neighbor the first and the second side surfaces 101, 102 in a direction perpendicular to the first and the second side surfaces 101, 102.

A lens barrel 15 moving in the direction of the optical axis is placed at the center of the base 10. The lens barrel 15 is moved in the direction of the optical axis by the driving of the auto-focusing driving unit 11, so a focal distance from an image sensor (not illustrated) is controlled. Furthermore, the lens barrel 15 can improve a camera function because a lens (not illustrated) is open or closed or a filter having an additional function is placed on the lens by the driving of the optical element driving unit 12.

As illustrated in FIG. 1, in the camera lens module in accordance with the first embodiment of the present invention, the auto-focusing driving unit 11 is disposed in parallel to the first side surface of the base 101, and the optical element driving unit 12 is disposed in parallel to the second side surface 102 in a direction opposite the first side surface 101. As will be described later, the optical element driving unit 12 may be disposed on one side surface of the base 10 because it has an approximately slim and flat shape having a specific thickness and has a rectangular shape. As will be described later, the optical element driving unit 12 is described below by taking a filter as an example.

The auto-focusing driving unit 11 faces the lens barrel 15, and the optical element driving unit 12 also faces the auto-focusing driving unit 11 with the lens barrel 15 interposed therebetween. Furthermore, the auto-focusing driving unit 11 and the optical element driving unit 12 are disposed to face each other. A single auto-focusing driving unit 11 is disposed, and a single optical element driving unit 12 is disposed.

A single optical image stabilizer driving unit may be disposed instead of the optical element driving unit 12. That is, one or two optical image stabilizer driving units may be disposed at the location of the optical element driving unit 12 in parallel to the second side surface 102 after removing the optical element driving unit 12.

The auto-focusing driving unit 11 is disposed to stand upright in the direction of the optical axis, and the optical element driving unit 12 is disposed to stand upright in the direction of the optical axis. C1 denotes the center of the optical axis.

Figure 2:
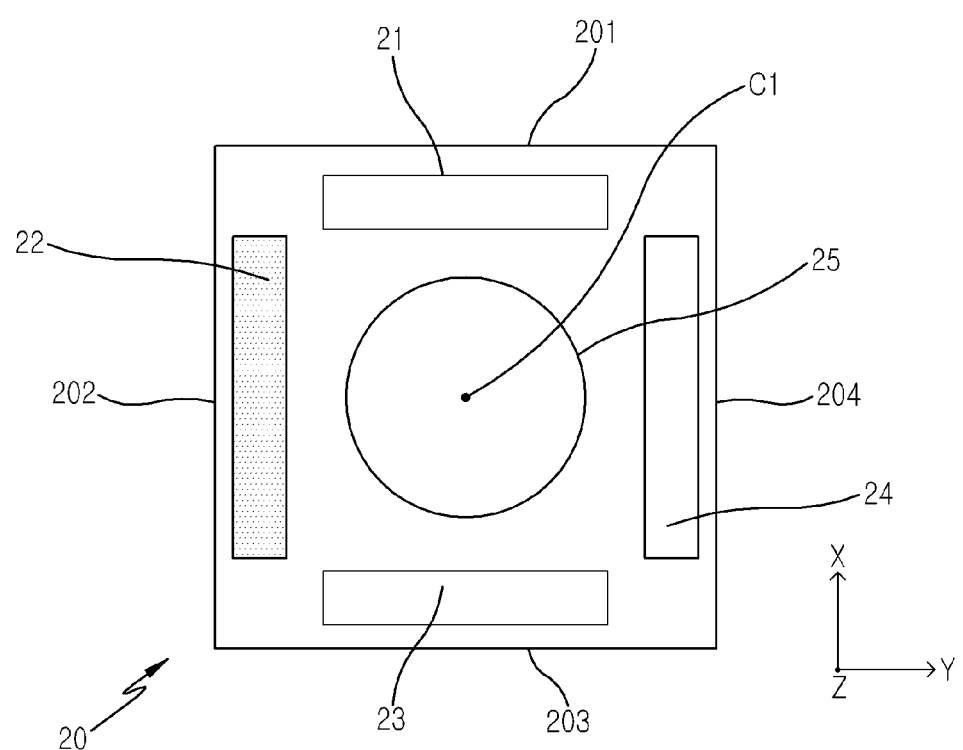
FIG. 2 is a plan view schematically illustrating the disposition of the driving units of a camera lens module in accordance with a second embodiment of the present invention.

FIG. 2 is a plan view schematically illustrating the disposition of the driving units of a camera lens module in accordance with a second embodiment of the present invention. The disposition of the driving units of the camera lens module in accordance with the second embodiment of the present invention is described below with reference to FIG. 2.

As illustrated in FIG. 2, the camera lens module includes a base 20, an auto-focusing driving unit 21, an optical element driving unit 22, and optical image stabilizer driving units 23, 24. The base 20 has a polyhedron shape, approximately a rectangular shape. The base 20 includes a top surface, a bottom surface, and four side surfaces. The four side surfaces include a first side surface 201, a second side surface 202, a third side surface 203, and a fourth side surface 204. The first side surface 201 is disposed in a direction perpendicular to the second side surface 202. The third side surface 203 is disposed in a direction perpendicular to the fourth side surface 204. The first side surface 201 stands opposite to the third side surface 203 and the second side surface 202 stands opposite to the fourth side surface 204, on the basis of an optical axis.

In the camera lens module of the second embodiment, the auto-focusing driving unit 21 is disposed in parallel to the first side surface 201 of the base 20, and the optical element driving unit 22 is disposed in parallel to the second side surface 202 disposed in the direction perpendicular to the first side surface 201. The auto-focusing driving unit 21 faces a lens barrel 25. Furthermore, the auto-focusing driving unit 21 and the optical element driving unit 22 are adjacently disposed so that they are perpendicular to each other.

A single auto-focusing driving unit 21 is disposed, and a single optical element driving unit 22 is also disposed. Furthermore, in the camera lens module, the first and the second optical image stabilizer driving units 23, 24 may be respectively disposed in parallel to the third and the fourth side surfaces 203, 204 that stand opposite to the first and the second side surfaces 201, 202.

Alternatively, a single optical image stabilizer driving unit may be disposed in parallel to any one of the third and the fourth side surfaces 203, 204 of the base 20. In other words, in the camera lens module, only the first optical image stabilizer driving unit 23 may be disposed, but the second optical image stabilizer driving unit 24 may not be disposed or only the second optical image stabilizer driving unit 24 may be disposed, but the first optical image stabilizer driving unit 23 may not be disposed.

In a modified embodiment of the present invention, a single optical image stabilizer driving unit may be disposed at the location of the auto-focusing driving unit 21 instead of the auto-focusing driving unit 21, and one or two auto-focusing driving units may be disposed at the locations of the one or two optical image stabilizer driving units 23, 24 instead of the one or two optical image stabilizer driving units 23, 24. That is, the single optical image stabilizer driving unit may be disposed in parallel to the first side surface 201, a first auto-focusing driving unit may be disposed in parallel to the third side surface 203, and a second auto-focusing driving unit may be may be disposed in parallel to the fourth side surface 204. The auto-focusing driving unit 21, the optical image stabilizer driving units 23, 24, and the optical element driving unit 22 are disposed to stand upright in the direction of the optical axis. C1 denotes the center of the optical axis.

Figure 3:
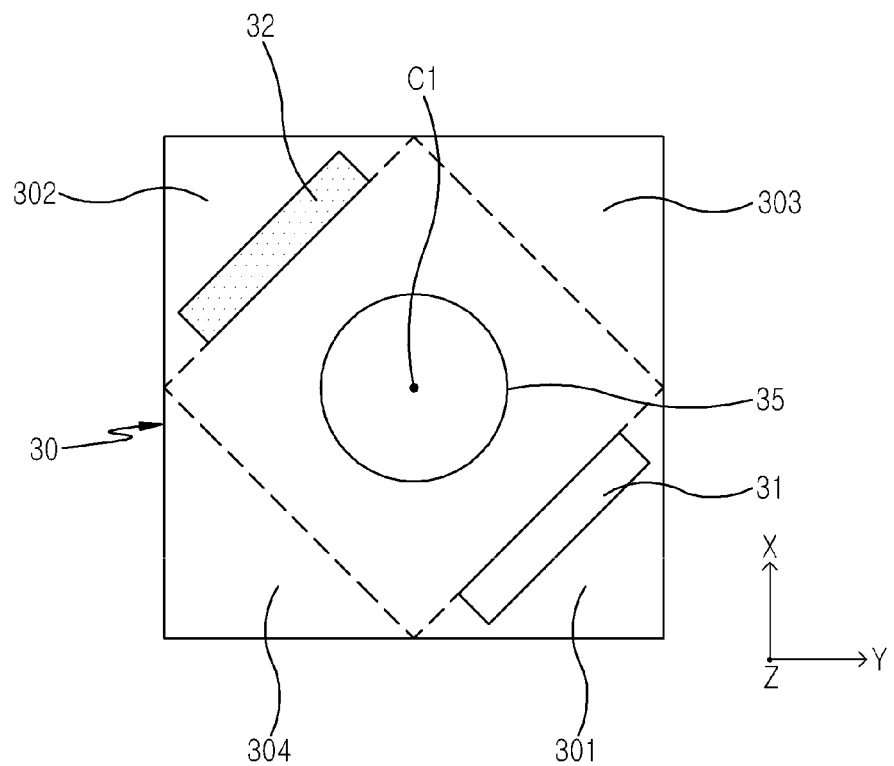
FIG. 3 is a plan view schematically illustrating the disposition of the driving units of a camera lens module in accordance with a third embodiment of the present invention.

FIG. 3 is a plan view schematically illustrating the disposition of the driving units of a camera lens module in accordance with a third embodiment of the present invention. The disposition of the driving units of the camera lens module in accordance with the third embodiment of the present invention is described below with reference to FIG. 3.

As illustrated in FIG. 3, the camera lens module in accordance with the third embodiment of the present invention may include a base 30, an auto-focusing control unit 31 disposed in the base 30, and an optical element driving unit 32. The base 30 includes four corner areas, that is, empty spaces. The four corner areas hereinafter include a first corner area 301, a second corner area 302, a third corner area 303, and a fourth corner area 304. The first corner area 301 is disposed to face the second corner area 302 in a diagonal direction, disposed to neighbor the third and the fourth corner areas 303, 304, and disposed in a direction perpendicular to the third and the fourth corner areas 303, 304 on the basis of an optical axis. The second corner area 302 is disposed to face the first corner area 301 in a diagonal direction, disposed to neighbor the third and the fourth corner areas 303, 304, and disposed in a direction perpendicular to the third and the fourth corner areas 303, 304 on the basis of the optical axis. The third corner area 303 is disposed to face the fourth corner area 304 in a diagonal direction, disposed to neighbor the first and the second corner areas 301, 302, and disposed in a direction perpendicular to the first and the second corner areas 301, 302 at the center C1 of the optical axis. The fourth corner area 304 is disposed to face the third corner area 303 in a diagonal direction, disposed to neighbor the first and the second corner areas 301, 302, and disposed in a direction perpendicular to the first and the second corner areas 301, 302 at the center C1 of the optical axis.

In the camera lens module of the third embodiment, the auto-focusing driving unit 31 is disposed in the first corner area 301 of the base 30, and the optical element driving unit 32 is disposed in the second corner area 302 of the base 30 that is diagonally disposed in the opposite direction of the first corner area 301. The auto-focusing driving unit 31 is disposed to face a lens barrel 35, and the optical element driving unit 32 is also disposed to face the lens barrel 35. Furthermore, the auto-focusing driving unit faces the optical element driving unit 32 with the lens barrel 35 interposed therebetween in a diagonal direction. Furthermore, the auto-focusing driving unit 31 and the optical element driving unit 32 are disposed to stand opposite to each other. A single auto-focusing driving unit 31 is disposed, and a single optical element driving unit 32 is also disposed.

Figure 4:
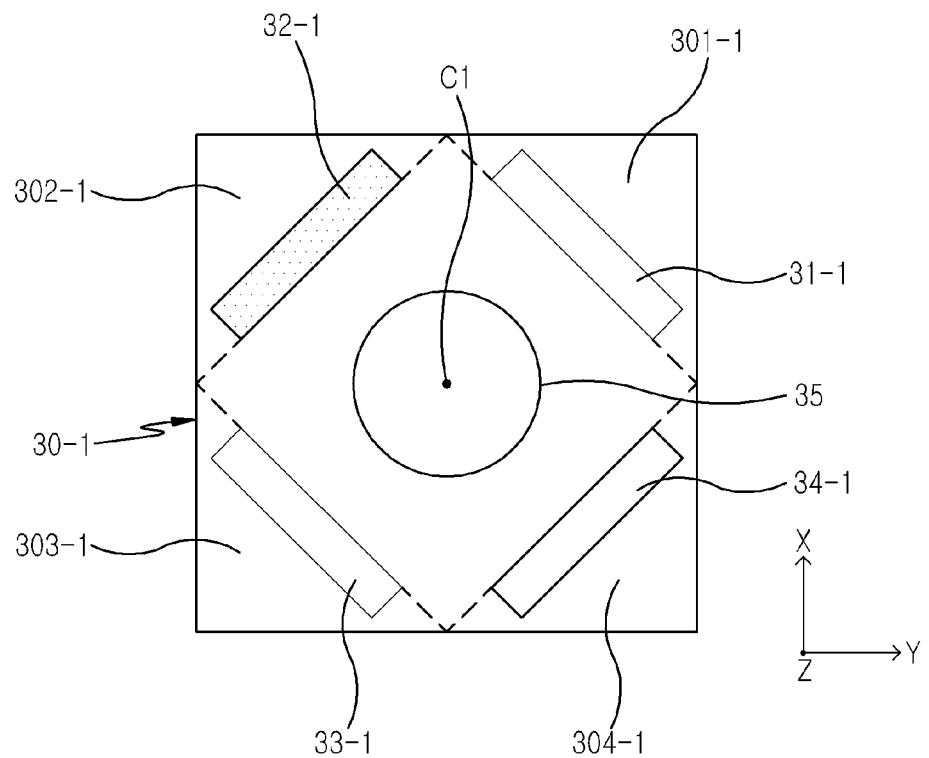
FIG. 4 is a plan view schematically illustrating the disposition of the driving units of a camera lens module in accordance with a fourth embodiment of the present invention.
Figure 5:
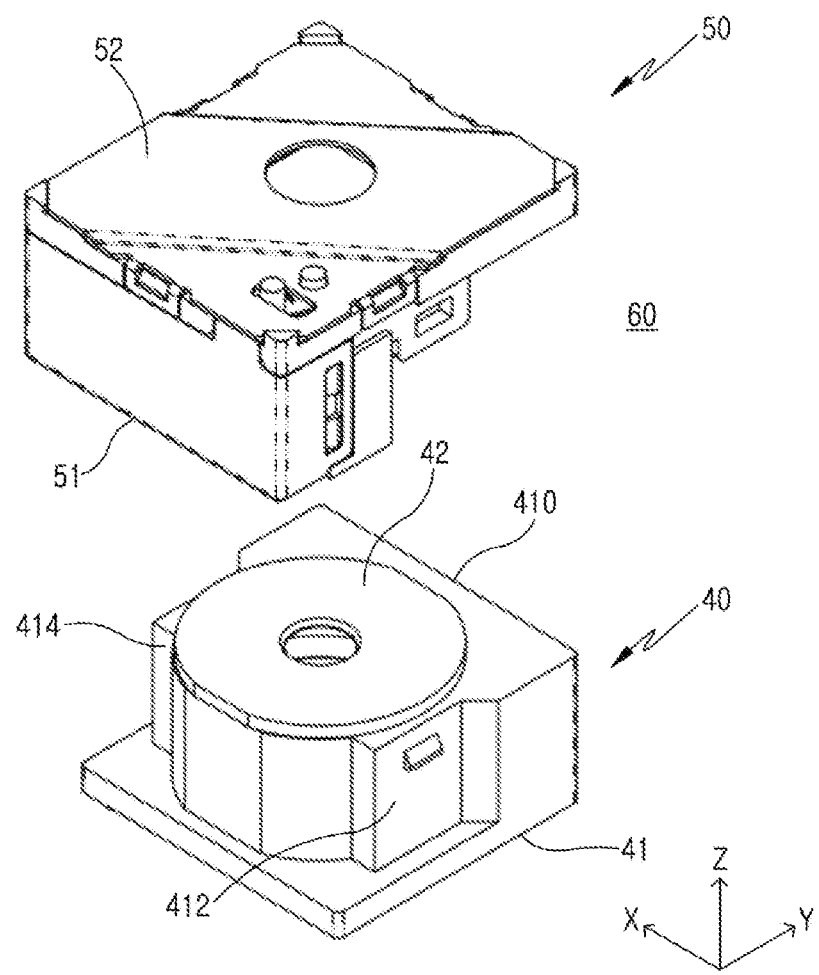
FIG. 5 is an exploded perspective view illustrating a camera lens module in accordance with an embodiment of the present invention.
Figure 6:
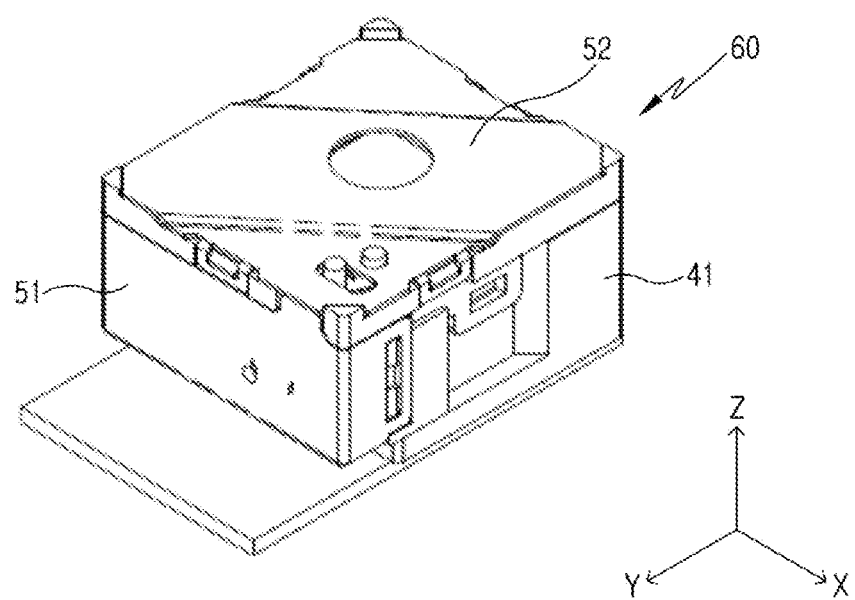
FIG. 6 is an assembled perspective view illustrating a camera lens module in accordance with an embodiment of the present invention.
Figure 7:
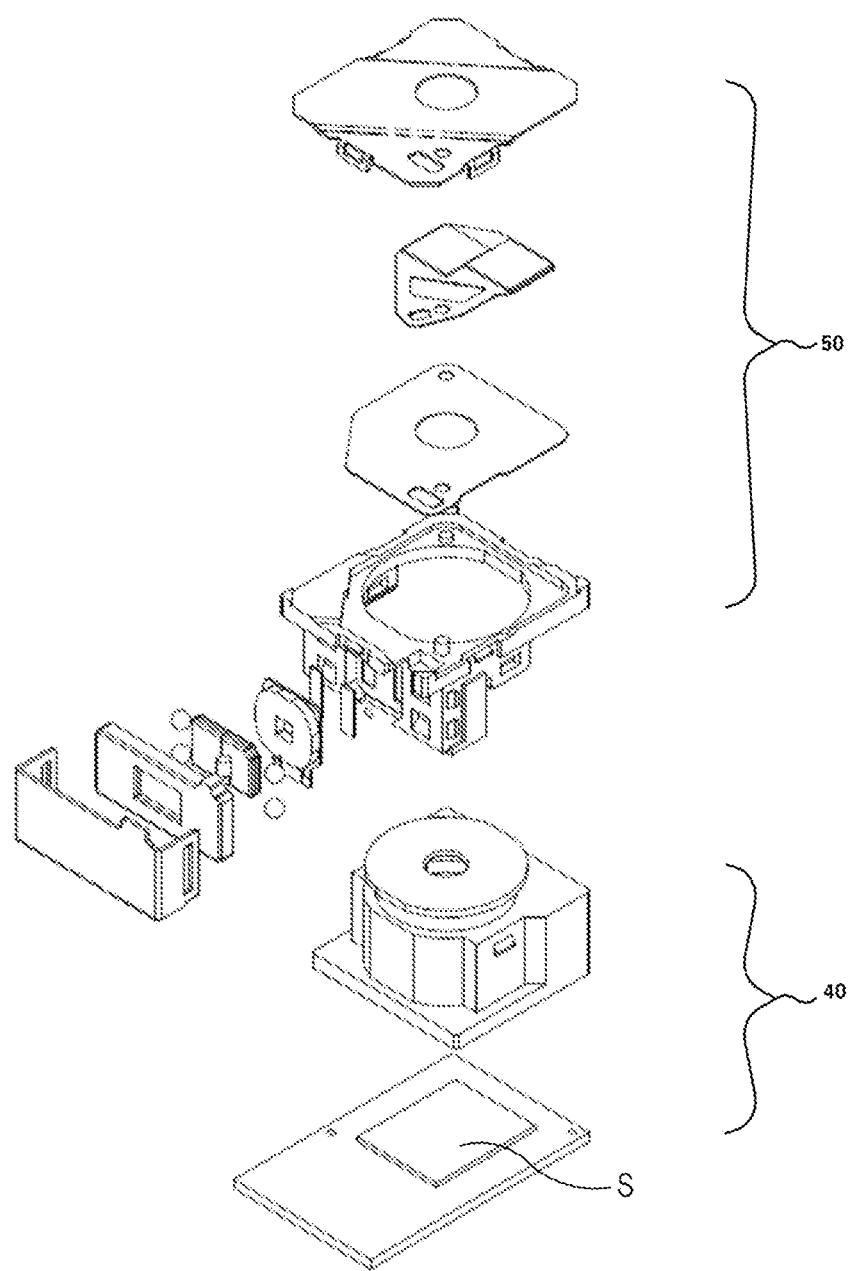
FIG. 7 is an exploded perspective view illustrating elements of the camera lens module in accordance with an embodiment of the present invention.
Figure 8:
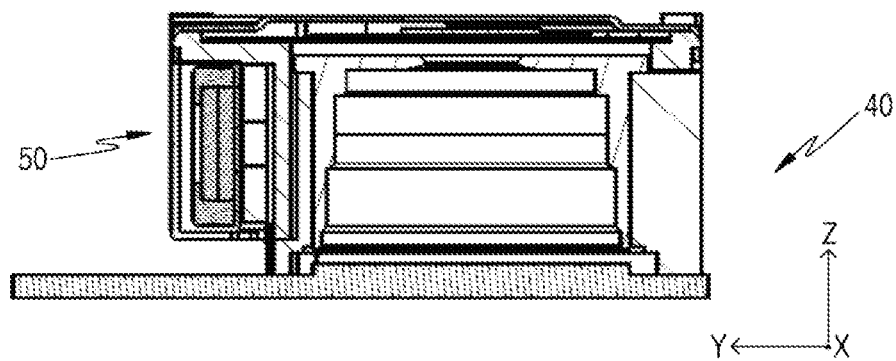
FIG. 8 is a front cross-sectional view illustrating the camera lens module of FIG. 6.
Figure 9:
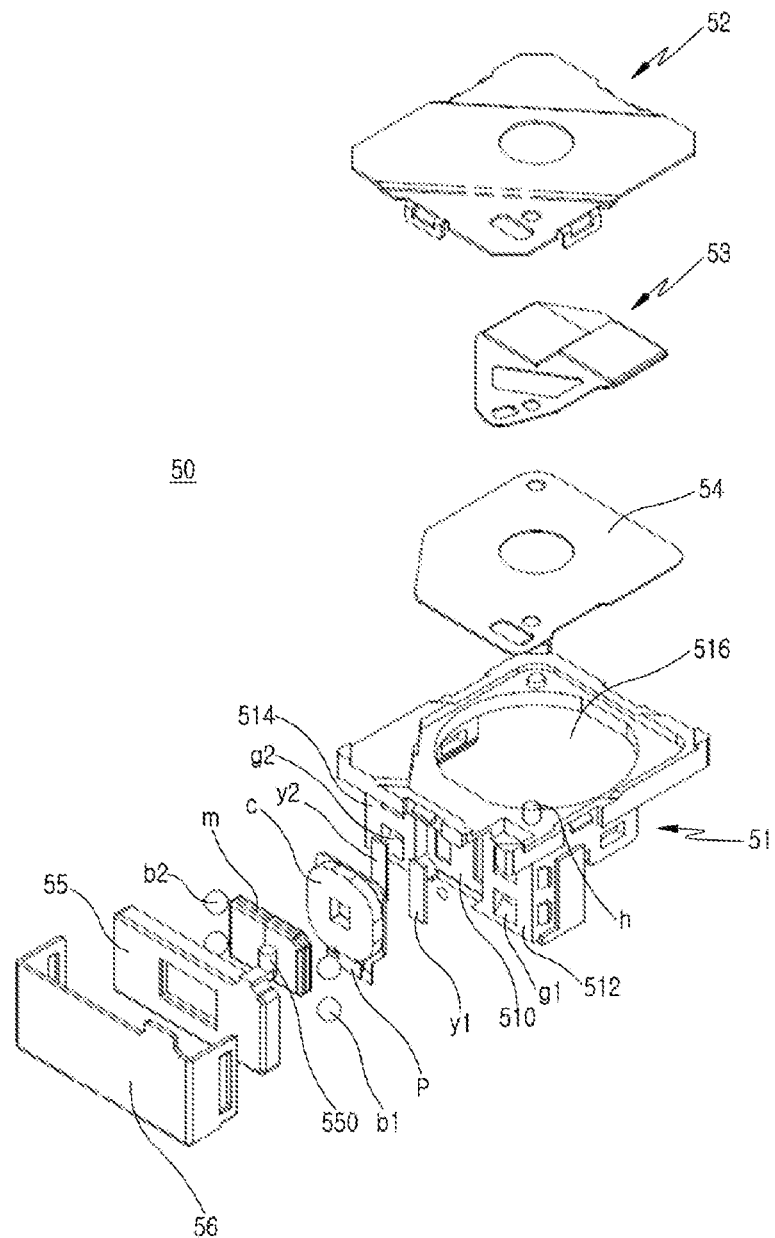
FIG. 9 is an exploded perspective view illustrating the elements of an optical element assembly adopted in the camera lens module in accordance with an embodiment of the present invention.

FIG. 4 is a plan view schematically illustrating the disposition of the driving units of a camera lens module in accordance with a fourth embodiment of the present invention. The disposition of the driving units of the camera lens module in accordance with the fourth embodiment of the present invention is described below with reference to FIG. 4.

As illustrated in FIG. 4, the camera lens module in accordance with the fourth embodiment of the present invention may include a base 30-1, an auto-focusing control unit 31-1 disposed in the base 30-1, an optical element driving unit 32-1, and first and second optical image stabilizer driving units 33-1, 34-1. The base 30-1 includes corner areas, that is, four empty spaces. The four corner areas include a first corner area 301-1, a second corner area 302-1, a third corner area 303-1, and a fourth corner area 304-1. The first corner area 301-1 is disposed in a direction perpendicular to the second corner area 302-1. The third corner area 303-1 is disposed in a direction perpendicular to the fourth corner area 304-1. The first corner area 301-1 stands opposite to the third corner area 303-1 in a diagonal direction and the second corner area 302-1 stands opposite to the fourth corner area 304-1 in a diagonal direction, on the basis of an optical axis.

In the camera lens module, the auto-focusing driving unit 31-1 is disposed in the first corner area 301-1 of the base 30-1, and the optical element driving unit 32-1 is disposed in the second corner area 302-1 disposed in the direction perpendicular to the first corner area 301-1. The auto-focusing driving unit 31-1 faces a lens barrel 35, and the optical element driving unit 32-1 also faces the lens barrel 35. Furthermore, the auto-focusing driving unit 31-1 is adjacent to the optical element driving unit 32-1 in a perpendicular direction. A single auto-focusing driving unit 31-1 is disposed, and a single optical element driving unit 32-1 is also disposed.

Furthermore, in the camera lens module of the fourth embodiment, the first and the second optical image stabilizer driving units 33-1, 34-1 may be disposed in the third and the fourth corner areas 303-1, 304-1 that respectively stand opposite to the first and the second corner areas 301-1, 302-1. The first and the second optical image stabilizer driving units 33-1, 34-1 are disposed to face the lens barrel 35 and area adjacent to each other in a perpendicular direction.

Alternatively, only one optical image stabilizer driving unit may be disposed in any one of the third and the fourth corner areas 303-1, 304-1 of the base 30-1. In other words, in the camera lens module of the fourth embodiment, only the first optical image stabilizer driving unit is disposed in the third corner area 303-1 and the second optical image stabilizer driving unit may not be disposed, or only the second optical image stabilizer driving unit is disposed in the fourth corner area 304-1 and the first optical image stabilizer driving unit may not be disposed in the third corner area 303-1.

In a modified embodiment of the present invention, in the camera lens module, an optical image stabilizer driving unit may be disposed instead of the auto-focusing driving unit 31-1, and first and second auto-focusing driving units may be disposed instead of the first and the second optical image stabilizer driving units 33-1, 34-1. That is, the auto-focusing driving unit 31-1 and the first and the second optical image stabilizer driving units 33-1, 34-1 may be respectively substituted with the optical image stabilizer driving unit and the first and the second auto-focusing driving unit.

The auto-focusing driving unit 31-1 is disposed to stand upright in the direction of the optical axis. The first and the second optical image stabilizer driving units 33-1, 34-1 are also disposed to stand upright in the direction of the optical axis. The optical element driving unit 32-1 is disposed to stand upright in the direction of the optical axis.

The disposition of the driving units of the camera lens modules in accordance with some embodiments of the present invention has been described by taking into consideration a reduction in the size. An optical element assembly including an optical element driving unit mounted on a camera lens assembly in accordance with embodiments of the present invention is described below with reference to some drawings.

The configuration of a camera lens assembly 60 in accordance with an embodiment of the present invention is described below with reference to FIGS. 5 to 17.

As illustrated in FIGS. 5 to 8, the camera lens assembly 60 may include an auto-focusing assembly 40 and an optical element assembly 50 coupled to the auto-focusing assembly 40. The optical element assembly 50 is coupled to the auto-focusing assembly 40 on the basis of the center of an optical axis, thereby completing the camera lens module 60 of FIG. 5. The auto-focusing assembly 40 is named because an auto-focusing driving unit (not illustrated) is installed on the other side surface 410 of the base 41. If an optical image stabilizer driving unit (not illustrated) is installed on the other side surface 410 of the base 41, the auto-focusing assembly 40 may be denoted as an optical image stabilizer assembly.

Furthermore, an auto-focusing driving unit may be mounted on the other side surface 410 of the auto-focusing assembly 40, and optical image stabilizer driving units may be disposed in spaces within front and rear side surfaces 412, 414.

The assembly of the modules of the camera lens module 60 is completed by coupling between the base 41 of the auto-focusing assembly 40 and the base 51 of the optical element assembly 50. A filter cover 52 is coupled to the top surface of the camera lens assembly 60. A coupling pin to be described later is exposed to some edge of the filter cover 52. A lens barrel 42 is moved in the direction of the optical axis by an auto-focusing driving unit (not illustrated), so the focal distance between a lens and an image sensor (illustrated in FIG. 6) is controlled.

The configuration of the optical element assembly 50 in accordance with an embodiment of the present invention is described below with reference to FIGS. 9 to 12. The optical element assembly 50 is disposed in parallel to one or a plurality of one side surfaces within a camera lens module as already described above. The optical element driving unit of the optical element assembly 50 may be disposed to face any one side surface not in the corner area of the camera lens module because it has an approximately flat-plate shape (i.e., a rectangular flat shape having a specific thickness). Furthermore, an auto-focusing driving unit (not illustrated) may be installed on the other side surface opposite one side surface in which the optical element driving unit has been installed.

The optical element assembly 50 includes an optical element base 51, the optical element driving unit, and an optical element unit. The optical element may be a filter. The optical element base 51 is a basic support coupled to an auto-focusing base. The optical element driving unit and the optical element unit are disposed in the optical element base 51. The optical element driving unit is mounted on the optical element base 51 in such a way as to stand upright in the direction of an optical axis. The optical element unit is disposed in parallel to the top surface of the optical element base 51 and mounted in such a way as to be rotated. An opening 516 having a specific diameter is formed in the top surface of the optical element base 51. The opening 516 is a space where the lens barrel is placed.

The optical element driving unit is mounted on one side surface of the optical element base in parallel to one side surface of the camera lens module, and provides a force that drives the optical element unit. That is, the optical element driving unit is mounted so that it operates in conjunction with the optical element unit, thus providing a force that rotates the optical element unit around a hinge h.

The optical element driving unit includes yokes y1, y2, a coil C, a movable magnet m, and guides g1, g2. The optical element driving unit functions to provide a force that rotates the optical element unit using an electromagnetic force generated between the coil C and the movable magnet m. When the movable magnet m is reciprocated left and right in response to the electric current of the coil C, the optical element driving unit rotates the optical element unit. The coil C is a stator, and the movable magnet m is a rotor. The optical element driving unit is a driving source mounted on one side surface of the camera lens module in such a way as to stand upright in the direction of the optical axis and configured to provide a force for moving the optical element unit disposed in parallel to the top surface of the optical element base 51, that is, disposed in parallel to a surface perpendicular to the optical axis (i.e., an X-Y plane).

The optical element base 51 is a stator, and has the yokes y1, y2, the coil C, and the guides g1, b1; g2, b2 mounted on one side surface thereof. A coil seating unit 510 having the center recessed is placed on the one side surface of the optical element base 51. Guides seating units 512, 514 are disposed on both sides of the coil seating unit 510. One (illustrated in FIG. 19) or a plurality of yokes y1, y2 is disposed on the bottom surface of the coil seating unit 510.

The yokes y1, y2 may be made of a magnetic materials and a metal material in order to provide an attractive force with the movable magnet m. The yokes include first and second yokes y1, y2 that are symmetrical to each other on the bottom surface of the coil seating unit 510, disposed to face the movable magnet m, and disposed in parallel. The first yoke y1 has a longish rectangular shape having a thickness, and is disposed on the bottom surface of the coil seating unit 510 in such a way as to extend in the direction of the optical axis. The second yoke y2 has the same shape as the first yoke y1, and is disposed to be symmetrical to the first yoke y1 next to the first yoke y1 in such a way as to extend in the direction of the optical axis.

The guide seating units 512, 514 are formed in the optical element base 51. The first and the second guides g1, b1; g2, b2 are respectively installed in the guide seating units 512, 514. The first and the second guides g1, b1; g2, b2 are mounted for a smooth movement of a magnet transfer housing 55 to be described later. In particular, when the first and the second guides g1, b1; g2, b2 are closely attached to the magnet transfer housing 55, they function as bearings and support a smooth movement of the magnet transfer housing 55. The magnet transfer housing 55 performs a rolling operation by the first and the second guides g1, b1; g2, b2.

The guides include the first and the second guides g1, b1; g2, b2 on both sides of the first and the second yokes y1, y2 or on both sides of the coil C. The first and the second guides g1, b1; g2, b2 support the magnet transfer housing 55. A pair of the first guides g1, b1 are configured and placed in the guide seating unit 512 on upper and lower sides thereof. The second guides g2, b2 are disposed symmetrically to the first guides g1, b1 on the basis of the coil C and disposed in the guide seating unit 514. The first and the second guides include respective ball bearings b1, b2. The ball bearings b1, b2 support the rolling operation of the magnet transfer housing 55.

The movable magnet m has an approximately rectangular shape having a thickness and a flat plate shape. The movable magnet m is safely accommodated in the magnet transfer housing 55a. The movable magnet m linearly reciprocates left and right (i.e., in the X-axis direction) and drives the optical element unit while maintaining a specific distance from the coil C through cooperation with the coil C. The distance between the coil C and the movable magnet m is maintained by the ball bearings b1, b2.

The magnet transfer housing 55 is a flat plate-shaped housing for accommodating the movable magnet m. The magnet transfer housing 55 moves in parallel on the coil C in the state in which the movable magnet m has been included in the magnet transfer housing 55. The magnet transfer housing 55 moves through a rolling operation in the state in which it has a direct contact with the ball bearings b1, b2 and linearly moves left and right (i.e., in the X-axis direction).

A coupling pin 550 coupled to the optical element unit is provided at the top corner of the magnet transfer housing 55 on one side thereof. When the magnet transfer housing 55 moves, the optical element unit performs a rotary motion around the hinge h in conjunction with the coupling pin 550. P denotes a printed circuit board (PCB) or flexible printed circuit board (FPCB) for electrically connecting the coil C to an external power source.

Figure 10:
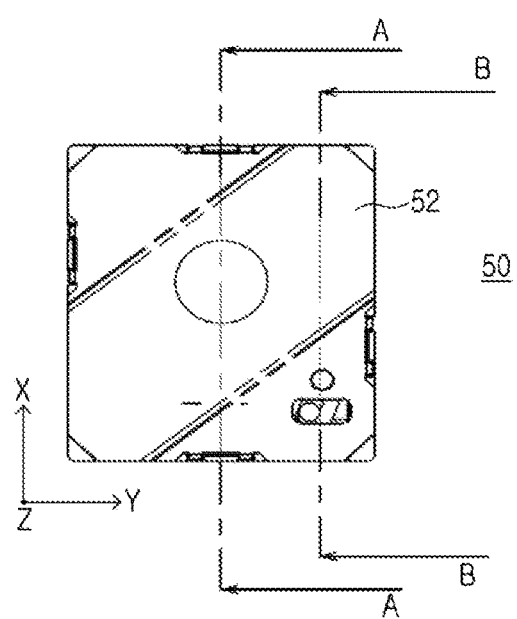
FIG. 10 is a plan view of a camera lens module in accordance with an embodiment of the present invention.
Figure 11:
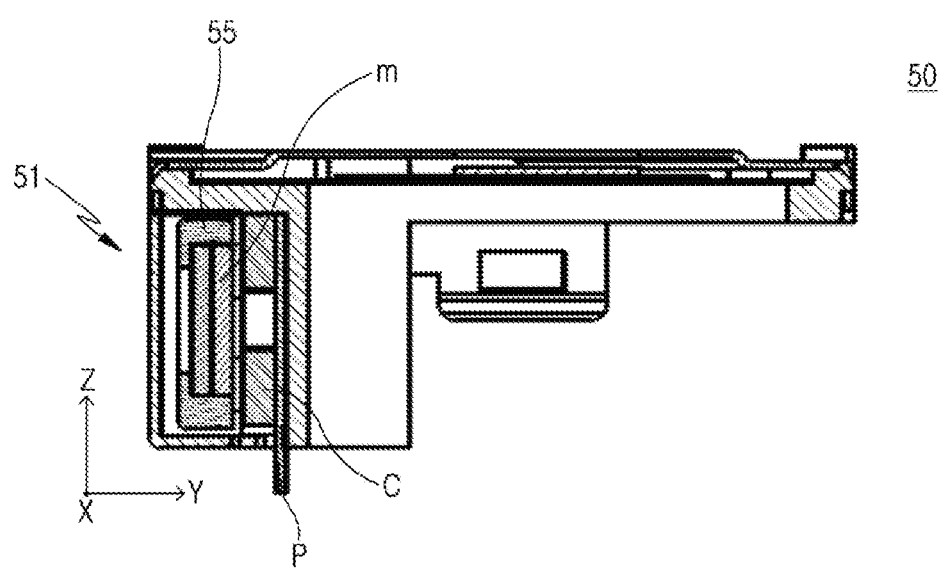
FIG. 11 is a cross-sectional view taken along line A-A of FIG. 10.
Figure 12:
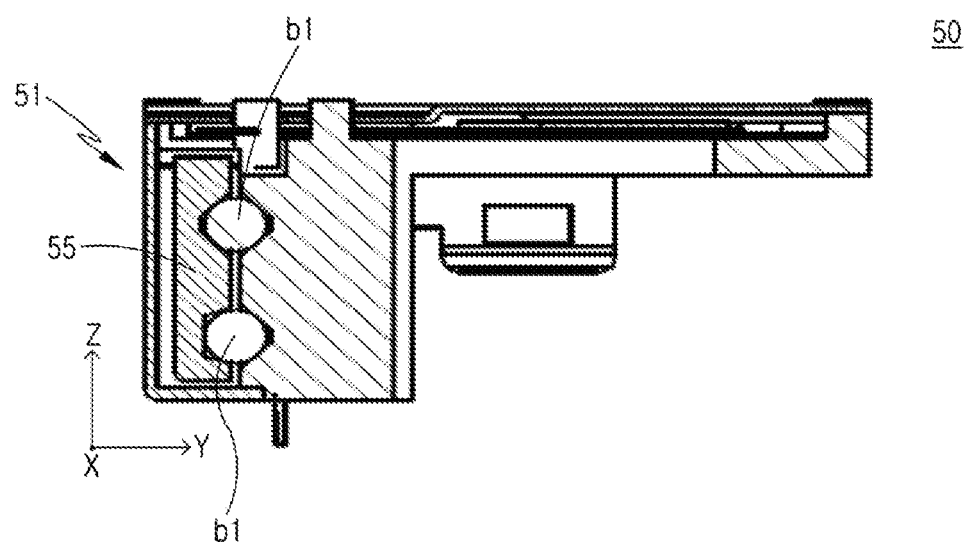
FIG. 12 is a cross-sectional view taken along line B-B of FIG. 10.

As illustrated in FIGS. 10 to 12, the coil C, the movable magnet m, and the magnet transfer housing 55 are mounted on one side surface of the optical element base 51. A specific gap is present between the movable magnet m and the magnet transfer housing 55, and the exterior of the coil C. The gap is provided by the ball bearings b1, b2. Furthermore, an attractive force between the magnet transfer housing 55 and the yokes y1, y2 is made possible because the yokes are made of a magnetic or metallic material. The reciprocation of the magnet transfer housing 55 in the X-axis direction is caused by an electromagnetic force generated when an electric current is applied to the coil C. The movable magnet m may be one-sidedly disposed on one side of the coil C and may be one-sidedly disposed on the other side of the coil C depending on whether a (+) pole or a (−) pole is applied to the coil C.

Figure 13:
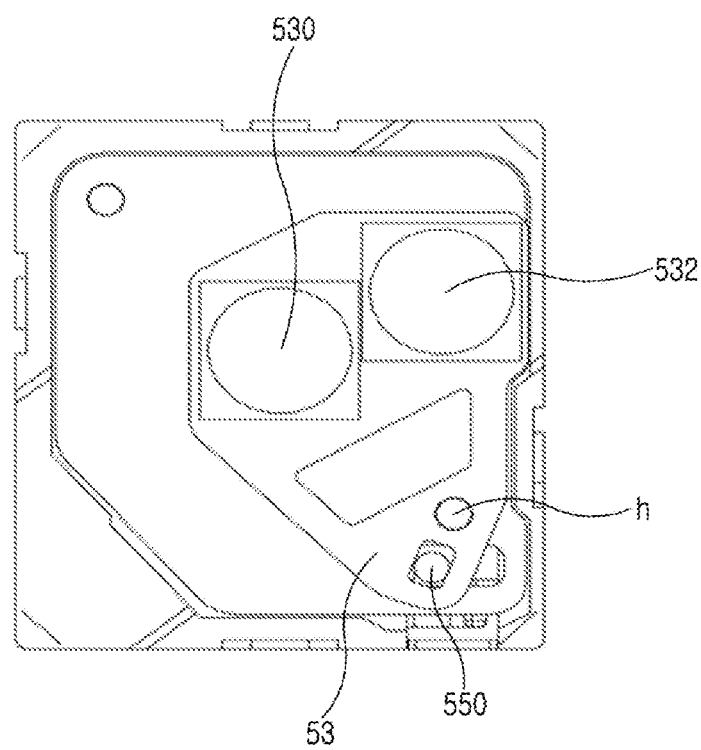
FIG. 13 is a plan view illustrating the optical element assembly of FIG. 8 in a first mode.
Figure 14:
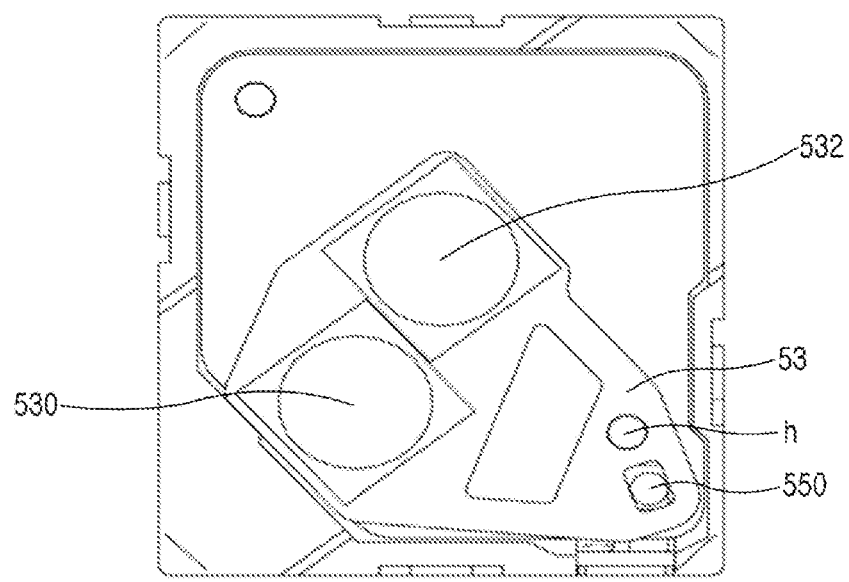
FIG. 14 is a plan view illustrating the optical element assembly of FIG. 8 in a second mode and is a diagram illustrating the state in which a filter blade has been rotated.
Figure 15:
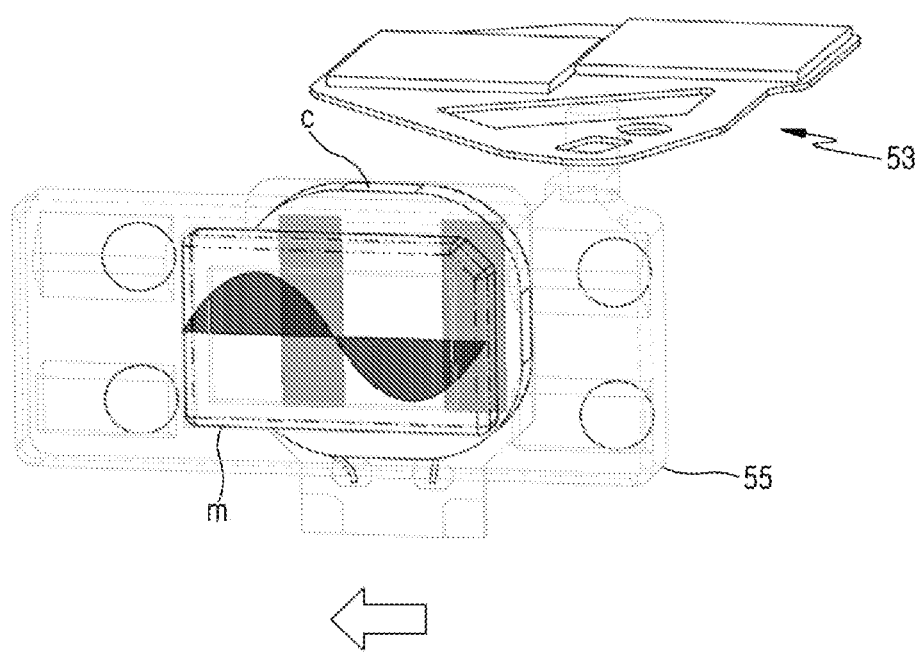
FIG. 15 is an exemplary diagram illustrating the state of a coil, movable magnet, and filter blade in the first mode of FIG. 13.
Figure 16:
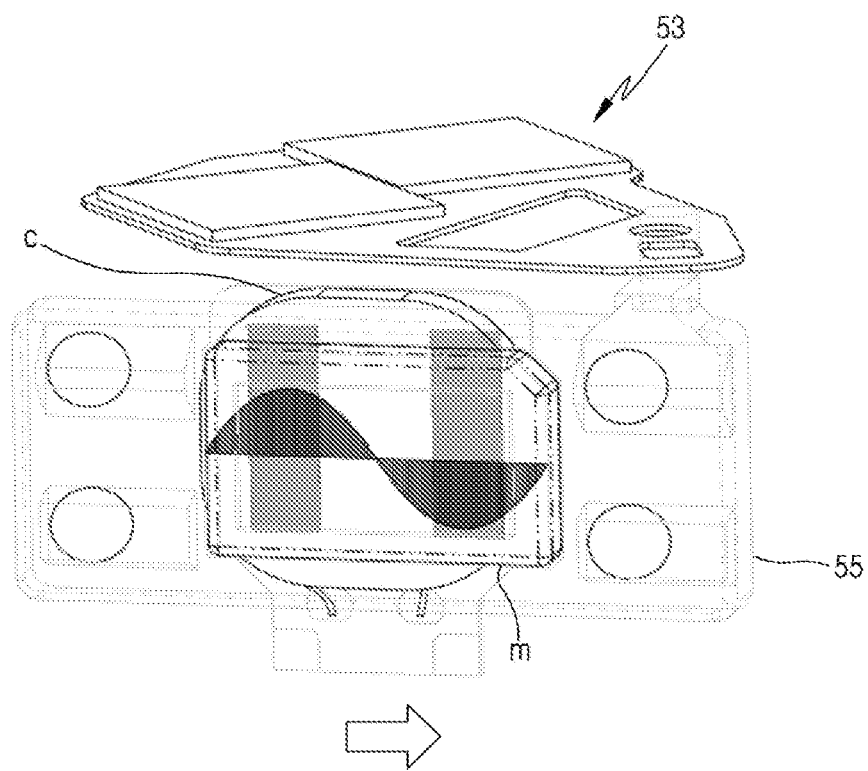
FIG. 16 is an exemplary diagram illustrating the state of the coil, movable magnet, and filter blade in the second mode of FIG. 13.

The driving of the optical element assembly is described below with reference to FIGS. 13 to 16. In the first mode of the camera lens module, the first filter 530 of a filter blade 53 is disposed at the center of the optical axis. That is, the first filter 530 is placed on the lens of a lens barrel (not illustrated). Such a state is illustrated in FIGS. 13 and 15. The movable magnet m is one-sidedly placed slightly to the left on the basis of the coil C.

When the first mode switches to a second mode, the direction of an electric current applied to the coil C is reversed, and thus the movable magnet m linearly moves to the right. Next, the filter blade 53 coupled to a coupling pin 550 is counterclockwise rotated, so the second filter 532 is disposed at the center of the optical axis. That is, the second filter 532 is placed on the lens of the lens barrel (not illustrated).

As a result, when the movable magnet m linearly moves, the coupling pin 550 also linearly moves, but the filter blade 53 rotates around the hinge h. Accordingly, the first filter 530 or the second filter 532 is placed at the center of the optical axis depending on the first or second mode.

Figure 17:
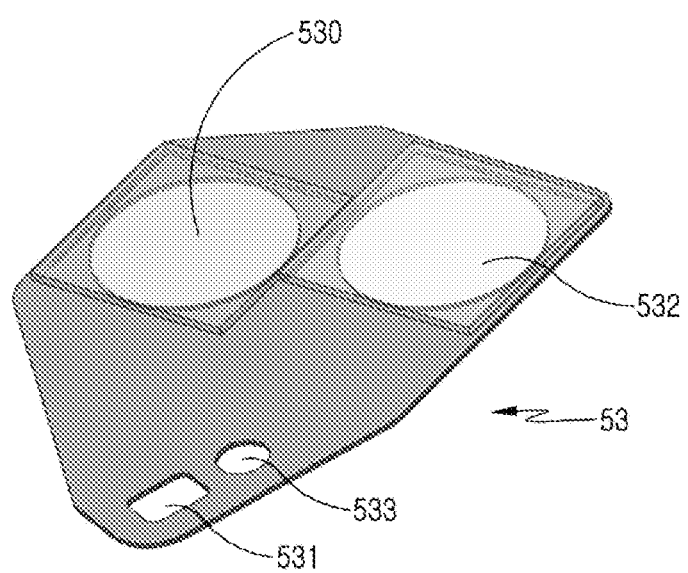
FIG. 17 is an enlarged perspective view of the filter blade on which a multi-filter in accordance with an embodiment of the present invention has been mounted.

An optical element that forms the optical element unit in accordance with an embodiment of the present invention, that is, the filter blade 53, is described below with reference to FIG. 17. The filter blade 53 may be called a multi-filter because it includes the two first and the second filters 530 and 532. Furthermore, any one of the first filter 530 and the second filter 532 may be deleted, and the deleted filter may be responsible for a shutter. Furthermore, the filter blade 53 may include at least three optical filters. The first and the second filters 530 and 532 are provided in specific areas of the filter blade and disposed in parallel.

The first filter 530 may be formed of a visible ray filter, and the second filter 532 may be formed of an infrared filter. Alternatively, the first and the second filters 530 and 532 may be configured in various ways depending on a photographing mode. For example, various optical filters may be used instead of the first filter 530 or the second filter 532. For example, the optical filters may include a bandpass filter, an ND filter, a PL filter, and a color filter. Furthermore, the filter blade 53 may include various lenses having optical zoom-in/out functions instead of the optical filter.

If the first filter 530 is formed of a visible ray cut-off filter and disposed at the center of the optical axis, the camera lens module may be applied to a common mode. If the second filter 532 is formed of an infrared (IR) band-pass filter and disposed at the center of the optical axis, the camera lens module may be applied to a security or authentication mode because the iris can be recognized. A first opening 531 into which the coupling pin is inserted is provided in an area of the filter blade 53 on one side thereof. A second opening 533 to which the hinge is coupled is provided in the filter blade 53. The first opening 531 is lengthily formed, so the coupling pin moves within the first opening 531.

Figure 18:
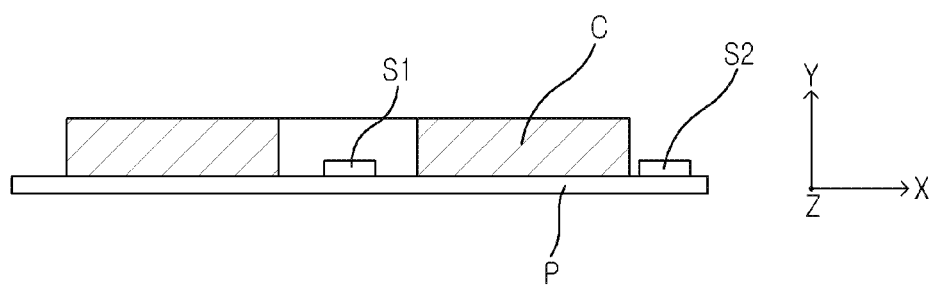
FIG. 18 is a cross-sectional view schematically illustrating the disposition of a proximity sensor in accordance with an embodiment of the present invention.

Referring to FIG. 18, an optical element assembly in accordance with an embodiment of the present invention may further include a position sensor. A position sensor S1 may be disposed in the internal space of the coil C or a position sensor S2 may be disposed near the coil C on the board P on which the coil C has been mounted. Each of the position sensors S1 and S2 may detect the location of the movable magnet and output a detection signal. The position sensor S1 disposed within the coil C or the position sensor S2 disposed near the coil C may be used by taking into consideration a mounting space.

Figure 19:
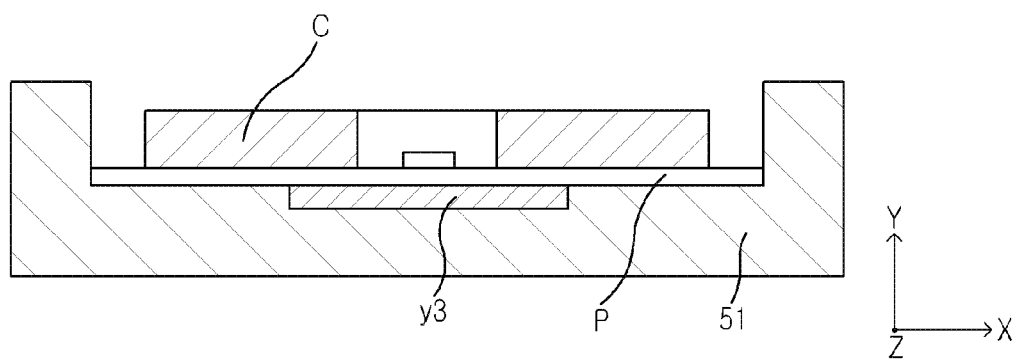
FIG. 19 is a cross-sectional view schematically illustrating the disposition of a single yoke in accordance with an embodiment of the present invention.

Referring to FIG. 19, a yoke in accordance with an embodiment of the present invention may include a single yoke y3. The single yoke y3 may be provided in the optical element base 51 in such a way as to stand upright in the direction of the optical axis. The single yoke y3 may be disposed at the bottom of the board P including the coil C in such a way as to be depressed.

Figure 20:
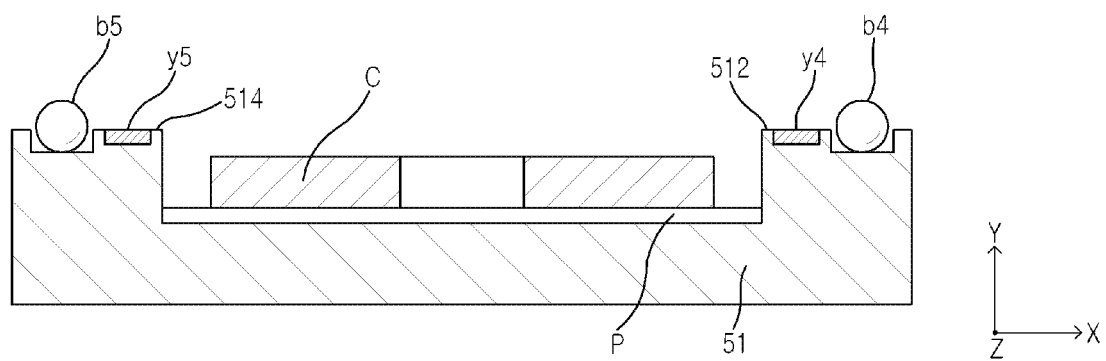
FIG. 20 is a cross-sectional view schematically illustrating the disposition of yokes and guides in accordance with another embodiment of the present invention.
Figure 21:
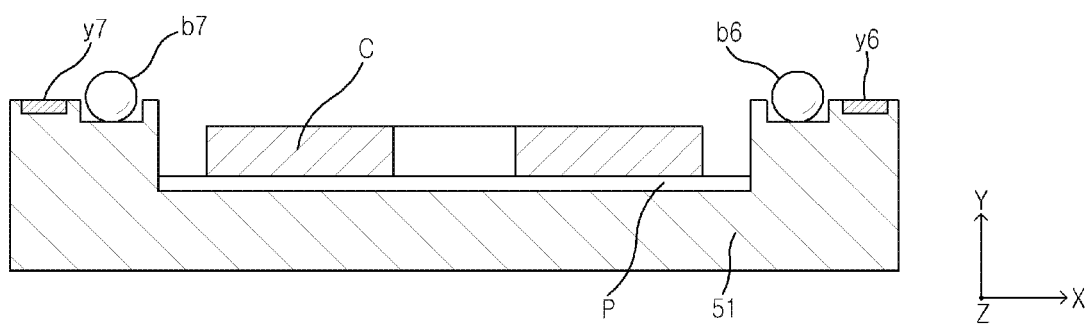
FIG. 21 is a cross-sectional view schematically illustrating the disposition of yokes and guides in accordance with yet another embodiment of the present invention.

Referring to FIGS. 20 and 21, first and second yokes y4, y5 in accordance with an embodiment of the present invention may be provided in the guide seating surfaces 512, 514 of the optical element base 51 not in the coil seating surfaces of the optical element base 51. Furthermore, the first and the second yokes y4, y5, together with ball bearings b4, b5, may be provided in the guide seating surfaces 512, 514. The first yoke y4 and the first ball bearing b4 may be disposed on one side of the coil C, and the second yoke y5 and the second ball bearing b5 may be disposed on the other side of the coil C.

Furthermore, the first and the second yokes y4, y5 may be respectively disposed inside the first and the second ball bearings b4, b5. Such a disposition state of the first and the second yokes y4, y5 is illustrated in FIG. 20. Furthermore, the first and the second yokes y6, y7 may be respectively disposed outside the first and the second ball bearings b6 and b7. Such a disposition state of the first and the second yokes y6, y7 is illustrated in FIG. 21. The inside refers to a direction that becomes close to the coil C, and the outside refers to a direction that becomes distant from the coil C.

Referring back to FIG. 9, the elements of the optical element driving unit are seated in one side surface of the optical element base 51 by an outer block side cover 56. The outer block side cover 56 is configured to have a length enough to accommodate the moving distance of the magnet transfer housing 55. The elements of the optical element unit are safely seated on the top surface of the optical element base 51 by the filter cover 52. Furthermore, the filter blade 53 performs a safe rotary movement on the top surface of the optical element base 51 by a filter guide plate 54 without intervention.

As described above, the camera lens module in accordance with an embodiment of the present invention is advantageous for a small-size design because the optical element driving unit is configured to have an approximately flat plate shape, mounted to face one side surface of the camera lens module, and disposed to face the auto-focusing control unit or the optical image stabilizer driving unit.

Furthermore, the camera lens module in accordance with an embodiment of the present invention is advantageous for a small-size design because the optical element driving unit is configured to have an approximately flat plate shape, disposed in a corner area of the camera lens module in such a way as to face the lens barrel, and disposed to face the auto-focusing control unit or the optical image stabilizer driving unit.

Furthermore, the camera lens module in accordance with an embodiment of the present invention is convenient in various photographing mode because it includes the multi-filter and is effective in mobile phone security authentication because it can recognize the iris.

Although the embodiments of the present invention have been illustrated and described, those skilled in the art will understand that the present invention may be modified in various ways in its form and details without departing from the spirit and scope of embodiments, such as the attached claims and those defined by their equivalents.

The invention claimed is:

1. A camera filter module, comprising:
   a base;
   one or a plurality of yokes mounted on one side surface of the base;
   a coil mounted on the one lateral side of the base and disposed to face the yoke;
   a flat plate-shaped movable magnet disposed in parallel to the coil in such a way as to face the coil and disposed to linearly move over the coil and to linearly move along the one lateral side surface of the base in a direction perpendicular to a direction of an optical axis when an electric current is applied to the coil;
   a plurality of guides including ball bearings and provided between the movable magnet and the coil and configured to guide a movement of the movable magnet; and
   an optical element unit disposed on an upper surface of the base to be in perpendicular to the flat plate-shaped movable magnet,
   wherein the optical element unit is configured to perform a rotary motion in conjunction with the flat plate-shaped movable magnet's moving in the direction perpendicular to the direction of the optical axis.

2. The camera filter module of claim 1, further comprises a magnet transfer housing on which the movable magnet is mounted,
   wherein the magnet transfer housing is configured in a flat plate form,
   wherein the magnet transfer housing is further configured to move over the coil along with the movable magnet with a gap by a rolling operation of the ball bearing,
   wherein the magnet transfer housing is further configured to move over the guides in the direction perpendicular to the direction of the optical axis,
   wherein the magnet transfer housing is further configured to linearly move along the one lateral side of the base, and
   wherein the optical element unit is further configured to perform the rotary motion around a hinge in conjunction with the magnet transfer housing's moving in the direction perpendicular to the direction of the optical axis.

3. The camera filter module of claim 2, further comprises a coupling pin extended in the direction of the optical axis in a top corner of the magnet transfer housing,
   wherein the optical element unit is a filter blade having one or a plurality of filters, and
   wherein the optical element unit is further configured to perform the rotary motion around the hinge in conjunction with the coupling pin's moving in the direction perpendicular to the direction of the optical axis.

\* \* \* \* \*